United States Patent
Crouch

(10) Patent No.: US 11,157,619 B2
(45) Date of Patent: Oct. 26, 2021

(54) METHOD AND SYSTEM FOR SELECTION OF LOCATION FOR PLACEMENT OF TROJANS, TRIGGERS AND INSTRUMENTS WITHIN INTEGRATED CIRCUITS AND ELECTRONIC SYSTEMS USING CONTRIBUTORY OPERATION ANALYSIS

(71) Applicant: Amida Technology Solutions, Inc., Washinton, DC (US)

(72) Inventor: Alfred Larry Crouch, Cedar Park, TX (US)

(73) Assignee: Amida Technology Solutions, Inc., Washington, DC (US)

(*) Notice: Subject to any disclaimer, the term of this patent is extended or adjusted under 35 U.S.C. 154(b) by 121 days.

(21) Appl. No.: 16/732,236

(22) Filed: Dec. 31, 2019

(65) Prior Publication Data

US 2021/0200868 A1 Jul. 1, 2021

(51) Int. Cl.
| | |
|---|---|
| G06F 21/56 | (2013.01) |
| G06F 30/33 | (2020.01) |
| G06F 21/76 | (2013.01) |
| G06F 21/85 | (2013.01) |

(52) U.S. Cl.
CPC ............ *G06F 21/564* (2013.01); *G06F 21/76* (2013.01); *G06F 21/85* (2013.01); *G06F 30/33* (2020.01)

(58) Field of Classification Search
CPC ......... G06F 21/564; G06F 30/33; G06F 21/76
See application file for complete search history.

(56) References Cited

U.S. PATENT DOCUMENTS

| | | | |
|---|---|---|---|
| 9,558,034 B2* | 1/2017 | Glew | G06F 9/30145 |
| 10,331,912 B2* | 6/2019 | Guilley | G06F 11/263 |
| 10,372,910 B2* | 8/2019 | Martin | G06F 21/554 |
| 10,572,659 B2* | 2/2020 | Ferragut | H04L 63/1433 |
| 10,931,635 B2* | 2/2021 | Rhee | H04L 63/0209 |
| 2013/0139262 A1* | 5/2013 | Glew | H04L 63/1466 726/23 |
| 2016/0098561 A1* | 4/2016 | Keller | G06F 21/554 726/24 |
| 2016/0098565 A1* | 4/2016 | Vedula | G06F 21/577 726/24 |
| 2017/0228562 A1* | 8/2017 | Guilley | H04L 9/002 |
| 2017/0357808 A1* | 12/2017 | Arroyo | H04L 63/1441 |
| 2018/0004948 A1* | 1/2018 | Martin | G06F 21/552 |
| 2018/0082058 A1* | 3/2018 | Ferragut | H04L 63/1425 |
| 2018/0204002 A1* | 7/2018 | Khorrami | G06F 21/554 |
| 2019/0347416 A1* | 11/2019 | Lacaze | G01R 31/002 |
| 2019/0347417 A1* | 11/2019 | Tehranipoor | G06F 21/568 |

* cited by examiner

*Primary Examiner* — Lynn D Feild
*Assistant Examiner* — Viral S Lakhia
(74) *Attorney, Agent, or Firm* — Hunt Pennington Kumar & Dula, PLLC; Artie Pennington

(57) ABSTRACT

A method and system for analysis of a facility may include providing an emulation host system, first generating a golden circuit model on the emulation host system, first inserting a first hardware trojan model, first emulating operation of the golden circuit model, and second emulating operation of the first hardware trojan model. The method includes the application of operative vectors to a golden model in simulation or emulation with support of embedded activity monitors to identify which modules contribute to a given functional operation as a method to identify where trojan attacks can be placed.

5 Claims, 3 Drawing Sheets

METHOD AND SYSTEM FOR SELECTION OF LOCATION FOR PLACEMENT OF TROJANS, TRIGGERS AND INSTRUMENTS WITHIN INTEGRATED CIRCUITS AND ELECTRONIC SYSTEMS USING CONTRIBUTORY OPERATION ANALYSIS

FIELD OF THE INVENTION

The disclosure relates generally to methods, systems, and apparatus for security assurance, protection, monitoring and analysis of integrated circuits and electronic systems in relation to hardware trojans.

BACKGROUND OF THE INVENTION

In general, in the descriptions that follow, the first occurrence of each special term of art that should be familiar to those skilled in the art of integrated circuits ("ICs") and systems will be italicized. In addition, when a term that may be new or that may be used in a context that may be new, that term will be set forth in bold and at least one appropriate definition for that term will be provided. In addition, throughout this description, the terms assert and negate may be used when referring to the rendering of a signal, signal flag, status bit, or similar apparatus into its logically true or logically false state, respectively, and the term toggle to indicate the logical inversion of a signal from one logical state to the other. Alternatively, the mutually exclusive Boolean states may be referred to as logic_0 and logic_1. Of course, as is well known, consistent system operation can be obtained by reversing the logic sense of all such signals, such that signals described herein as logically true become logically false and vice versa. Furthermore, it is of no relevance in such systems which specific voltage levels are selected to represent each of the logic states.

Hereinafter, reference to a facility shall mean a circuit or an associated set of circuits adapted to perform a particular function regardless of the physical layout of an embodiment thereof. Thus, the electronic elements comprising a given facility may be instantiated in the form of a hard macro adapted to be placed as a physically contiguous module, or in the form of a soft macro the elements of which may be distributed in any appropriate way that meets speed path requirements. In general, electronic systems comprise many different types of facilities, each adapted to perform specific functions in accordance with the intended capabilities of each system. Depending on the intended system application, the several facilities comprising the hardware platform may be integrated onto a single IC, or distributed across multiple ICs. Depending on cost and other known considerations, the electronic components, including the facility-instantiating IC(s), may be embodied in one or more single- or multi-chip packages. However, unless expressly stated to the contrary, the form of instantiation of any facility shall be considered as being purely a matter of design choice.

Electronic systems and facilities including circuits such as integrated circuits, chips, circuit boards, electronic devices, and components thereof, are subject to attacks and intrusions from malicious content or hardware trojans (hereinafter, collectively "hardware trojans"). As used herein, the term "hardware trojan" includes inherent malicious content or elements that may be included in a facility, and that may be exploited. For clarity, hardware trojans, as referenced herein, are to be distinguished from software trojans and related malicious software.

Hardware trojans, for example, may intend to function to break or prevent normal operation, allow unauthorized taking over or locking, steal data, steal circuit structure, degrade the hardware, degrade circuit operations, or inject errors into data being processed. A non-exhaustive listing of labels or references for hardware trojans includes, without limitation, the following: "denial of service" (DoS) indicating preventing the integrated circuit from conducting its normal function for some period of time; "ransomware" indicating the taking over or locking of an integrated circuit until a payment is extracted; "data theft" indicating that critical information stored or processed within the integrated circuit has been exfiltrated (such as, for example, customer information, account numbers and account passwords that can be used for identity theft and to access financial accounts); "structure theft" indicating that design or operation information concerning the electronic system or facility thereof has been exposed to enable reverse-engineering or counterfeiting; and "destructive operation" indicating that a facility or electronic system may be operated in such a manner as to provide physical damage (for example, operating built-in self-test logic (BIST) until a facility goes into thermal overload and physically melts).

The capability to allow these types of attacks stems from inadvertent or intentionally malicious content (i.e., "hardware trojans") included within the facility hardware, such as integrated circuit hardware. Instantiations of malicious content, both inadvertent and intentional, may be labeled or referenced by several names, but may be generally referred to as "security vulnerabilities" or "security exploits" (hereinafter, collectively, "security exploits"). Security exploits may be incorporated within a facility, or within an electronic system including a facility, at any point in design, development, integration, implementation, testing, programming, packaging, and distribution; or at any point in the design-manufacturing-distribution supply chain.

In the age of the internet, the internet-of-things ("IoT"), and ubiquitous home and business electronics, the prevalence of cyberattacks has become a key concern of many owners and users of those electronics. Many attacks source from, and make use of, the connection to the internet. Often overlooked, however, are the hardware trojans hidden, and embedded, and/or built right into the electronic hardware, i.e., trojan attacks. A trojan attack is the inclusion of hardware trojans within an electronic device. The trojan attack becomes realized when the trojan is activated and delivers its designated payload or takes its designated action. Trojans may be "always on" or may be triggered or activated by an event.

Trojans may be inserted into the electronic devices and systems at many different phases of that include by way of example the design and development phase, the manufacturing phase, and the assembly phase. By way of example, trojan attacks may include non-specified features added to an original design, may be nefarious functions within a counterfeit function that is added to the design, e.g., IP cores within a semiconductor design, or that replaces a unit or device within the overall system, e.g., a counterfeit semiconductor device placed on a board.

More specifically, hardware trojans may be introduced into a facility, for example, when intellectual property ("IP") cores ("IP cores") are licensed from third parties for incorporation in an integrated circuit design. IP cores may include hidden trojan circuits providing various security exploits. So, for example, a design engineer acting with a nefarious purpose may include one or more trojan circuits to perform undesired functions, such as providing unsecured or readily enabled back-door access or memory space for future software viruses and malware. A design engineer also may design tools that generate, insert or synthesize circuit content, such as test and debug logic, that may be modified to include hardware trojans. A design engineer may design tools or provide implementations that operate on one form of design model to create a different, undesired form of design model. By way of example, logic synthesis from a behavioral model to a gate-level model may be mapped to the gate library that targets a specific fabrication facility. By way of a different example, design tools may provide a place-and-route conversion from a gate-level model to a physical model that adds and includes power, clock, electro-static-discharge ("ESD") protection structures, and those design tools may be corrupted by being designed to add hidden malicious content during the conversions.

Other means of trojan insertion include some scenarios where a circuit design may be passing through the fabrication process, e.g., in an IC foundry, and subtle changes in doping and chemical exposure may result in transistors, gates, signal routes and insulation layers not behaving properly in the final implemented silicon device. By way of example, the impacted elements may be sensitive to voltage levels or temperature levels or temperature ranges, or may produce unexpected emissions. By way of a different example, during the IC testing process, a programming step may place identification numbers or encryption codes or other defining steps for the integrated circuit device, and the test process may be altered to either provide incorrect values, or may place the values in alternate places within the device, where the misplaced values may be snooped or leaked in the future. Even when the sliced-and-diced silicon is packaged into plastic or ceramic chip carriers, devices may have unused signal connections or unused functions connected to package pins to be accessed by nefarious parties in the future. By way of example, a package pin may be accessed and act as a signal connection to leak data, but may be misidentified in the IC data book as a ground connection.

Hardware trojans may be incorporated within custom designs such as, for example, application specific integrated circuits ("ASIC"), or may be incorporated within designs destined to become standard parts. Examples may include application specific standard parts ("ASSP"), microprocessors, microcontrollers, systems-on-a-chip ("SOC"), and standardized memory chips ("DDR", "DIMM", "HBM", etc.). When electronic systems are made from these chips, either custom systems made from custom IC's or systems made from commercial-off-the-shelf ICs (COTS), there is a risk that one or multiple chips incorporated into the electronic design may be compromised, or that groupings of chips can be arranged together to allow access to trojan malicious content at the system level or to create complex trojan malicious content at the system level. In an example, a hardware trojan may provide back door access to secured kernel memory that holds a primary operating system.

Electronics manufacturers, producers, and providers have three basic strategies they may consider when providing electronic devices and systems that include consideration of a security, i.e., cybersecurity, threat. As a first strategy, the provider can ignore adding or supporting any cybersecurity techniques and content if they believe that their electronics are inconsequential, e.g., not important enough to warrant an attack by nefarious individuals, industrial enemies or nation-states. This first strategy may also may be used if they have consequential electronics and simply do not wish to invest in any cybersecurity techniques due to the expense involved or the belief that the probability of a cyberattack is minimal. The second strategy that may be considered is to establish a defensive position that requires detecting the trojans and their triggers before they can activate and deliver their payload. And finally, the third strategy that may be considered is to assume that all electronics are infected and to invest in post-attack recovery techniques.

The strategy of ignoring cyber-hardening has been illustrated ineffectual because this strategy does not take into consideration that even inconsequential electronics such as TVs, DVRs, cameras, thermostats, light bulbs and household appliances may be used as BOTs to conduct distributed denial-of-service ("DDOS") or Domain-Name-Server ("DNS") attacks.

A defensive strategy requires utilizing detection mechanisms in and around the system of interest, where those detection mechanisms may be used to identify the assertion of specific triggering events, e.g., triggers assert, or to identify the activation of specific trojans within the system. A purely defensive strategy may suffer from what may be termed an "iceberg problem", e.g., even though one or more triggers or trojans is affirmatively detected within the system, the exact number of triggers and/or trojans in the system remains unknown. One strategy of a nefarious actor, e.g. a "black hat", may be to provide triggers and trojans within the system that are more easily found, thus masking more sophisticated trojans within the system.

A strategy that assumes infection of all electronics also suffers from the inherent detection issue of a defensive strategy. However, the goal with this strategy is to give more analytical weight to post trigger and attack recovery, rather than the prevention or simple detection of the attack. Post attack recovery inherently requires understanding the impact of the attack on the electronic system such that the consequences of the attack may be managed. And, in order to implement a recovery mechanism in the system that will be effective post deployment, the nature of the recovery must be anlayszed and understood prior to the when electronic system is deployed. Said another way, this strategy is an integral part of the overall design of the electronic system.

In order to apply the defend strategy or the assume infection strategy, the different points where an unauthorized user may attack the electronic system or extract data from the electronic system, e.g., attack surface, must be understood. Ideally, the attack surface must be understood during the design process, or at the very least, before the system is deployed. There is not one single method that can ideally identify when or where an attack will occur, nor can a single method ideally identify where in the electronics the attack is located. Therefore, different analysis methods must be used to predict different types of attacks. The goal is to identify the most-likely, highest probability attacks and to evaluate the effect of those attacks through simulation or emulation.

One of us, Alfred Crouch, has developed certain improvements for use in the cybersecurity systems, which improvements are fully described in the following pending applications or issued patents, all of which are expressly incorporated herein in their entirety:

"Method, System and Apparatus for Security Assurance, Protection, Monitoring and analysis of Integrated Circuits and Electronic Systems in Relation to Hardware trojans", application Ser. No. 16/145,89, filed 28 Sep. 2018; and "Method, System and Apparatus for Security Assurance, Protection, Monitoring and analysis of Integrated Circuits and Electronic Systems in Relation to Hardware trojans", application Ser. No. 16/450,336, filed 24 Jun. 2019.

In reality, trojan effects can be launched from any gate connection or route in the design. However, there are some guidelines the black hat may use in selecting the best locations to place trojans such that the trojans will have the desired attack goal and so that the trojan will make it to the targeted activation point without being discovered. One guideline is: "minimum work or change for the maximum amount of damage or exposure." Another guideline, similar to fault collapsing and fault management, is "a trojan can be viewed as a fault/defect/bug placed by a human intelligence as opposed to imperfect design and manufacturing processes". More specifically, this means that the human intelligence will choose locations within the electronic system for trojan insertion and trigger conditions that are difficult to find, making it less likely for the trojan to be discovered before its planned use.

It is also highly unlikely that a trojan attack is the result of a simple analysis during manufacturing where the nefarious individual picks a single transistor, gate or route to modify—this may not result in the desired targeted attack, with the exception of a few easy attacks such as placing a triggered gating element across the widely distributed clock or reset lines. Any easy attack implemented at manufacturing can actually be easily discovered if an effort is made during silicon verification. It is more likely that the nefarious individual wishes to implement a more complex and stealthy attack and has information on the design, the behaviors, the functions and the application of the device they intend to infect with a trojan. An attack is then targeted to achieve the required attack goal. By way of example, an attack may be targeted to prevent the device from conducting its normal operations or to prevent the device from operating altogether, i.e., a kill switch, or to allow a device to be taken over and controlled, i.e., $3^{rd}$ party operation, ransomware, or to leak critical information or structure, i.e., to enable reverse engineering or to expose secret data, codes or keys. For a provider of electronics to defend against attacks or to provide countermeasures, requires the anticipation of most-likely attacks. Anticipation of the attacks have proven to be resistant to any single form of analysis and requires the evaluation of the design to be manufactured to be examined multiple different ways to predict the different types of trojan attacks and their impact on the deployed electronics.

For reasons stated above and for other reasons which will become apparent to those skilled in the art upon reading and understanding the present specification, there is a need in the art for improved methods, systems, and apparatus for security assurance, protection, monitoring and analysis of facilities and electronic systems including circuits, such as integrated circuits, in relation to hardware trojans.

BRIEF DESCRIPTION OF THE INVENTION

The above-mentioned shortcomings, disadvantages and problems are addressed herein, as will be understood by those skilled in the art upon reading and studying the following specification. This summary is provided to introduce a selection of concepts in simplified form that are further described below in more detail in the Detailed Description. This summary is not intended to identify key or essential features of the claimed subject matter.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In accordance with an embodiment a method for selection of a location for placement of a selected one of a trojan, and an instrument within an electronic facility using contributory operation analysis, the method comprising the steps of developing a target operation vector, developing a hierarchical module map of a first golden model of the electronic facility, the module map comprising an instance of an operative module, inserting an operative monitor into the instance of the operative module, the operative monitor being adapted to record operative activity of the instance of the operative module, applying the target operation vectors to the first golden model, the operative monitor recording the operative activity of the instance of the operative module, developing from the operative activity a contributory operation map of the golden model, the contributory operation map comprising operative activity of the operative module, copying the first golden model to a second golden model, inserting the trojan into the second golden model, as a function of the contributory operation map, a vulnerability heuristics database, and a trojan database, applying the target operation vectors to the second golden models, the operative monitor in the second golden model recording the operative activity of the instance of the operative module in the second golden model, comparing the operative activity of the first golden model with the operative activity of the second golden model, and inserting the instrument into the first and second golden models, as a function of the comparing of the operative activity of the first golden model with the operative activity of the second golden model.

BRIEF DESCRIPTION OF THE DRAWINGS

The disclosed subject matter itself, as well as further objectives, and advantages thereof, will best be illustrated by reference to the following detailed description of embodiments of the device read in conjunction with the accompanying drawings, wherein.

Figure 1:
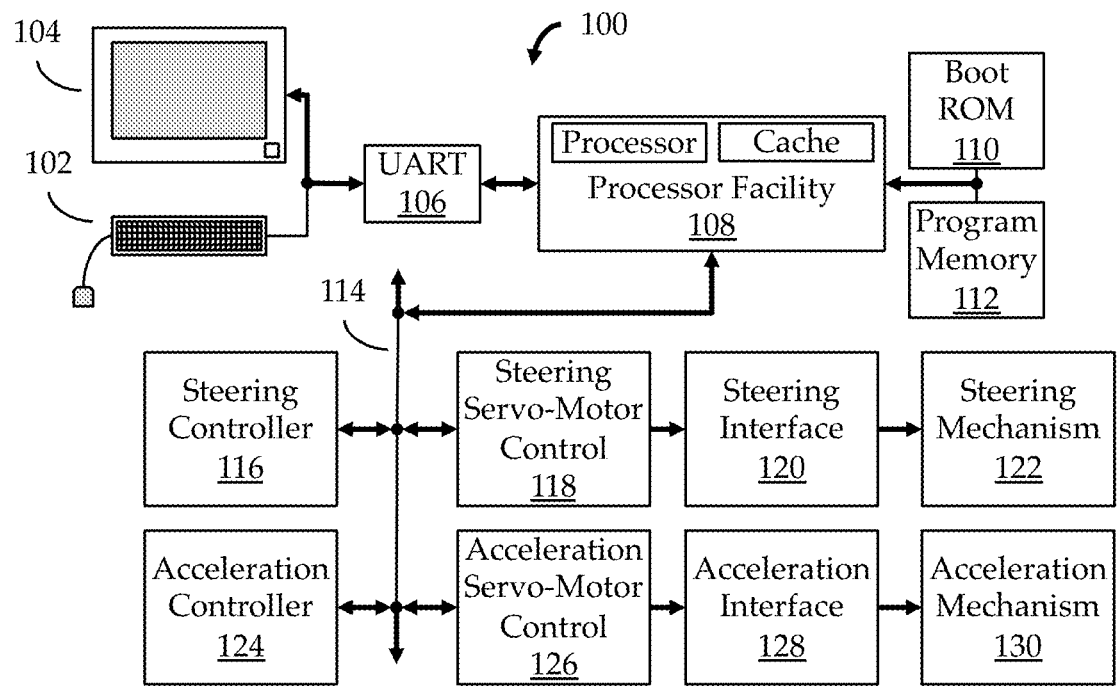
FIG. 1 illustrates, in block diagram form, an exemplary electronic facility that may be the subject of the aforementioned trojan attacks, and to the analytical methods described herein according to some embodiments.

In the drawings, similar elements will be similarly numbered whenever possible. However, this practice is simply for convenience of reference and to avoid unnecessary proliferation of numbers, and is not intended to imply or suggest that our invention requires identity in either function or structure in the several embodiments.

DETAILED DESCRIPTION OF THE INVENTION

In this detailed description, reference is made to the accompanying drawings which form a part hereof, and in which is shown by way of illustration specific embodiments which may be practiced. These embodiments are described in sufficient detail to enable those skilled in the art to practice the embodiments and disclosure. It is to be understood that other embodiments may be utilized, and that logical, mechanical, electrical, and other changes may be made without departing from the scope of the embodiments and disclosure. In view of the foregoing, the following detailed description is not to be taken as limiting the scope of the embodiments or disclosure.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises" and/or "comprising" or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be appreciated that for simplicity and clarity of illustration, where considered appropriate, reference numerals may be repeated among the figures to indicate corresponding or analogous elements. In addition, numerous specific details are set forth in order to provide a thorough understanding of the implementations described herein. However, it will be understood by those of ordinary skill in the art that the implementations described herein may be practiced without these specific details. In other instances, well-known methods, procedures and components have not been described in detail so as not to obscure the implementations described herein. Also, the description is not to be considered as limiting the scope of the implementations described herein.

The detailed description set forth herein in connection with the appended drawings is intended as a description of exemplary embodiments in which the presently disclosed apparatus and system can be practiced. The term "exemplary" used throughout this description means "serving as an example, instance, or illustration," and should not necessarily be construed as preferred or advantageous over other embodiments.

The two philosophical statements made previously— "minimum work/change for maximum damage/exposure", and "a trojan can be viewed as a defect/fault/bug inserted by a human intelligence"—enable the analysis of a cybersecurity breach, e.g., a trojan infection of electronic system, to be viewed as a "single fault assumption". Therefore, all of the mathematics and tools applied to fault accounting and analysis may be used to consider the best location and impact of a trojan attack. These tools provide efficiency in the analytical process, as opposed to the brute force method of considering every gate as a possible location for multiple possible trojans, e.g., a 2-input AND-gate has 6 stuck-at faults—Stuck-at-1/0 on each input port and Stuck-at-1/0 on the output port, and 6 delay faults, slow-to-rise and slow-to-fall delay faults on those same ports. By way of example, fault mathematics state that for any given cone of logic, where several registers feed a mass of combinational logic that resolves to a single register, there are a number of faults that will resolve to a Stuck-at-1 and a number of faults that will resolve to a Stuck-at-0. The fault closest to the capture register that is a Stuck-at-1 may be the fundamental fault and all other faults in the cone of logic that resolve to the same value are the equivalent faults. During fault simulation, all faults that create the same effect at a monitored node, ideally a test point, are removed as detected, an operation known to one of ordinary skill in this art as fault collapsing. Similarly, in this manner, trojans may be evaluated as a reduced set of all possible trojans by focusing on fundamental trojans. This view of trojan insertion and trojan detection may allow other design methods to be considered when considering the placement of trojans, and subsequently, where to place instruments that can be used to detect anomalous circuit conditions and activity that can be attributed to trojan attacks.

There are several methods that can be used to evaluate where to put the trojan—functional analysis; mathematical analysis and heuristic analysis. The subject matter method discussed herein focuses on various aspects of the functional analysis.

Functional analysis imitates one way the black hat attacker will approach the where to put the trojan problem. The black hat will want to understand the potential use of the electronic device and will want to install features that give them an advantage within the final deployed use of the electronics (semiconductor chips, boards or systems). FIG. 1 illustrates, in block diagram form, an exemplary electronic facility 100 that may be the subject of the aforementioned trojan attacks, and to the analytical methods described herein according to some embodiments. Electronic facility 100 is generally representative of electronic facilities that may be available in marine vessels, aircraft, and automobiles, and includes the digital and analog components of an exemplary directional control (steering) system and a throttle control (acceleration) system. Electronic facility 100 may include an interface that comprises keyboard 102, monitor 104, and Universal Asynchronous Receiver/Transmitter ("UART") 106. Electronic facility 100 also includes processor facility 108 that interfaces with keyboard 102 and monitor 104 by way of UART 106, as well as interfacing with boot Read Only Memory ("ROM") 110, program memory 112, and with bus 114. Electronic facility 100 also includes an exemplary steering controller 116 that communicates with bus 114 and with steering servo-motor control 118. Steering servo-motor control 118 communicates with the steering mechanism 122 via the steering interface 120. Similarly, acceleration controller 124 communicates with bus 114 and with acceleration servo-motor control 126. Acceleration servo-motor control 126 communicates with acceleration mechanism 130 via the acceleration interface 128.

Methods anticipating the potential location and impact of a trojan imitate those methods that may be used by a black hat attacker. The black hat attacker would study the electronic system, including any semiconductor devices included therein, and its intended application(s), and would develop a functional targeted attack based on the desired attack goals. By way of example, if the electronic system were a steering and acceleration control system, as illustrated in FIG. 1, then the black hat attacker may wish to disable the rudder and/or aileron if the electronic facility 100 were located in an aircraft. Likewise, the black hat attacker may wish to disable the rudder and/or propeller if the electronic facility 100 were located in a marine vessel. These types of attacks would require the black hat attacker to acquire an understanding of the functions of the steering and acceleration control system and/or devices therein and subsequently designing a specific, hidden, trojan attack on certain features or functions. Where the trojan attack is slated for an area of a semiconductor device, this information can then be supplied to the design and/or fabrication process or to a specific fabrication step, and the appropriate transistors, gates or routes can be modified to implement the attack.

Said another way, fundamentally, the placement of the trojan requires an understanding of which embedded logic elements are involved with a particular targeted function. An attacker would evaluate the electronic system and determine the easiest modification to provide an attack. Referring to FIG. 1, the black hat attack could be a number of places within electronic facility 100, i.e., at the input devices keyboard 102 and monitor 104, at the outputs of steering servo-motor control 118 and/or acceleration servo-motor control 126, or could be internally to the processor facility 108 that connect the input functions to the conversions and transformations needed to generate the output functions. A black hat attacker that had access to a simulation model or netlist, i.e., a VHDL or Verilog model or netlist, could develop and apply vectors for the various features. In the case of exemplary electronic facility 100, one potential attack would be to prevent the correct input data from reaching the steering servo-motor control 118 by sticking the inputs of that block to a constant logic-0's, assuming that constant logic-0's result in the rudder staying centered. This effectively implements a kill switch, thus preventing any turning.

Figure 2:
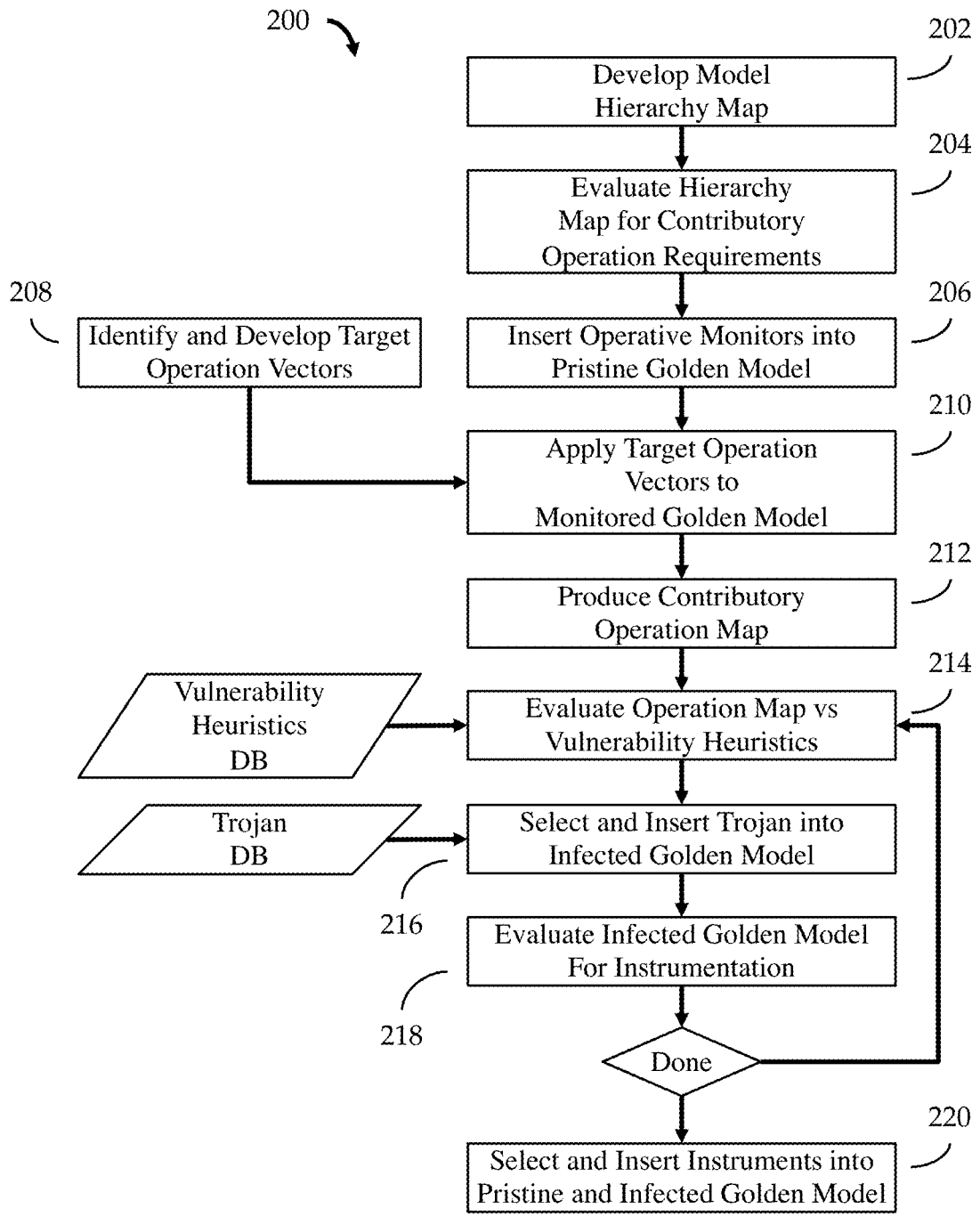
FIG. 2 illustrates, in flow chart form, operation of the analytical methods described herein according to some embodiments.

In order to understand how to implement these attacks, the black hat attacker must have information about these functions and what activities or input vectors activate these activities or functions within the electronic facility 100. Likewise, for the one wishing to anticipate these attacks for defense and countermeasure purposes, i.e., a white hat, the white hat has to perform a similar set of evaluations and analysis. FIG. 2 illustrates, in flow chart form, operation of the analytical method 200 described herein according to some embodiments. At a high level, in order to enable anticipating where an actual trojan may be placed within a design, method 200 includes a simulation of a model or a netlist, an application of specific vectors developed to activate specific logic involved, and a method to observe the logic that is actually involved with the expected behavior.

Figure 3:
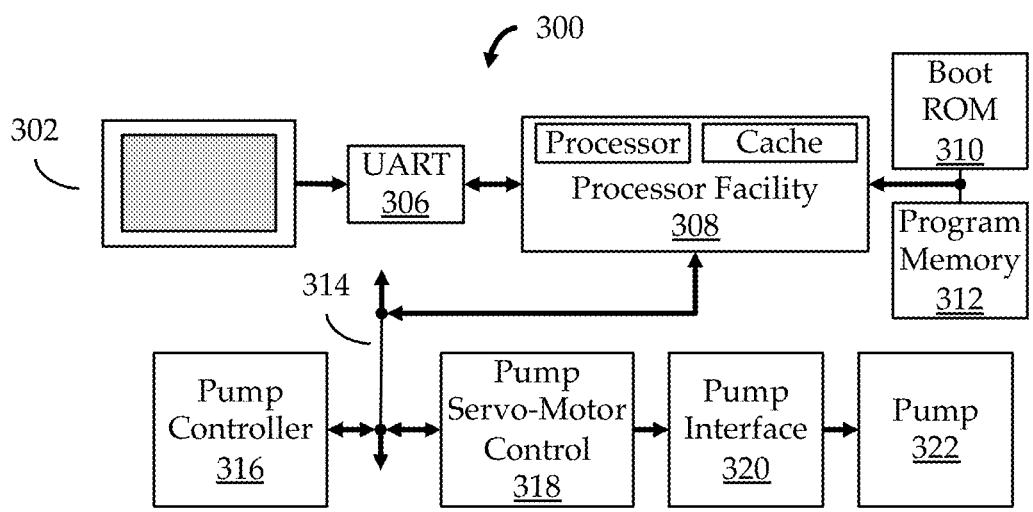
FIG. 3 illustrates, in block diagram form, another exemplary electronic facility that may be the subject of the aforementioned trojan attacks, and to the analytical methods described herein according to some embodiments.

Before the method 200 is discussed in detail, the concept of a pristine golden model or pristine golden netlist should be introduced. FIG. 3 illustrates, in block diagram form, just such an exemplary pristine golden model or pristine golden netlist of an exemplary electronic facility 300 that may be the subject of the aforementioned trojan attacks, and to the analytical methods described herein according to some embodiments. Electronic facility 300 may include an interface that comprises a touch screen monitor 302, and UART 306. Electronic facility 300 also includes processor facility 308 that interfaces with wireless monitor 302 by way of UART 306, as well as interfacing with boot ROM 310, program memory 312, and with bus 314. Electronic facility 300 also includes an exemplary pump controller 316 that communicates with bus 314 and with pump servo-motor control 318. Pump servo-motor control 318 communicates with the pump mechanism 322 via the pump interface 320.

Referring back to FIG. 2, according to one embodiment, method 200 includes developing a hierarchical map of the golden model at step 202. By way of example, a text parser applied to the behavioral model can be used to identify all of the module statements and the instanced modules that can be found within those module statements—the instanced modules can then be evaluated for their module statements and any instanced modules that can be found within those defined module statements can be identified, and so on hierarchically until all modules from the lowest level up to the top module are logged and organized. Referring to FIG. 3, the hierarchical map will include all of the top level modules, e.g., the pump controller 316, the program memory 312, etc., as well as the submodules or leaf cells within each of the top level modules. Next, referring back to FIG. 2, method 200 evaluates the hierarchical map of the golden model for contributory operation requirements at step 204, i.e., for the modules or paths of interest, are there significant active nodes within the path or module. By way of example, referring back to FIG. 3, if the concern is that a trojan attack may disable the use of the pump 322, the contributory operation requirements identified would be at least the function of the logic within pump controller 316, the pump servo-motor control 318, the pump interface 320, the pump 322, and the toggle activity of the signals interfacing between the respective blocks.

Next, referring back to FIG. 2, method 200 inserts or embeds operative monitors into the pristine golden model at step 206. Operative monitors are virtual software objects that may determine toggle content of a module or a signal. It is worth noting that in today's power conscious designs or power managed designs, it is considered bad design practice to let modules that provide no operative content to randomly toggle as vectors are provided. It is a known best practice in the industry that designs should manage the input vector to be an applied constant or that the internal operation is gated or enable by "valid operation" signals.

Method 200 includes identifying and developing target operation vectors at step 208. According to this step, target functional operations are identified that may be the subject of a trojan attack and vectors that focus on that target operation are developed for application to a target golden model or golden netlist. Step 210 applies the targeted vectors developed in step 208 to the pristine golden register-transfer language model ("RTL") or to the pristine golden gate-level netlist model and uses the operative monitors inserted in Step 206 to identify all of the active modules in the model or netlist and their hierarchical structure, i.e., modules within modules, and provide a contributory activity report of the modules involved with any given operation, thereby producing the contributory operations map of Step 212. Referring to FIG. 3, the previously discussed contributory operation requirements identified at least the function of the logic within pump controller 316, the pump servo-motor control 318, the pump interface 320, the pump 322, and the toggle activity of the signals interfacing between the respective blocks. Steps 208-212 develops those vectors targeted at those specific modules, apply those same vectors, and utilize the embedded operative monitors to record and identify the toggle activities in those modules identified. As discussed earlier, a Toggle model can be used to identify active modules or any signals that indicate the module is operating validly, e.g., such as data valid or operation enable. Again, it is worth noting that modern electronics tend to suppress activity in unused portions of a device to conserve power and reduce heat generation so highly active modules indicate processes that are contributory to the overall goal of the applied vectors. If the model being evaluated is a physical model and includes power distribution networks or models, or an emulated hardware module, then power and switching monitors, e.g., di/dt monitors, may be used to determine contributory operation—for digital behavior models that do not include physical indicators, signal transitions and digital activity must be used to determine contributory operation.

This type of analysis is analogous to a human being placed in an MRI machine and told to do different task and then imaging is accomplished to see which portions of the brain lights up. The goal of Steps 208-212 is to simulate the pristine golden model or golden netlist to determine what portions of the model "light up" for different target activities or target operations. Embedded operative monitors, e.g. detection instruments, identify when a module has "contributory operation," e.g., when significant operations, beyond establishing an initial state for a specific module, provides data or state sequences to the current defined operation. Once a contributory activity map for target operations and functions has been created, the modules, logic, and signals associated with and/or involved with a potential trojan attack is identified. A trojan attack on the pump 322 would require placing the trojan within the now identified logic.

Figure 4:
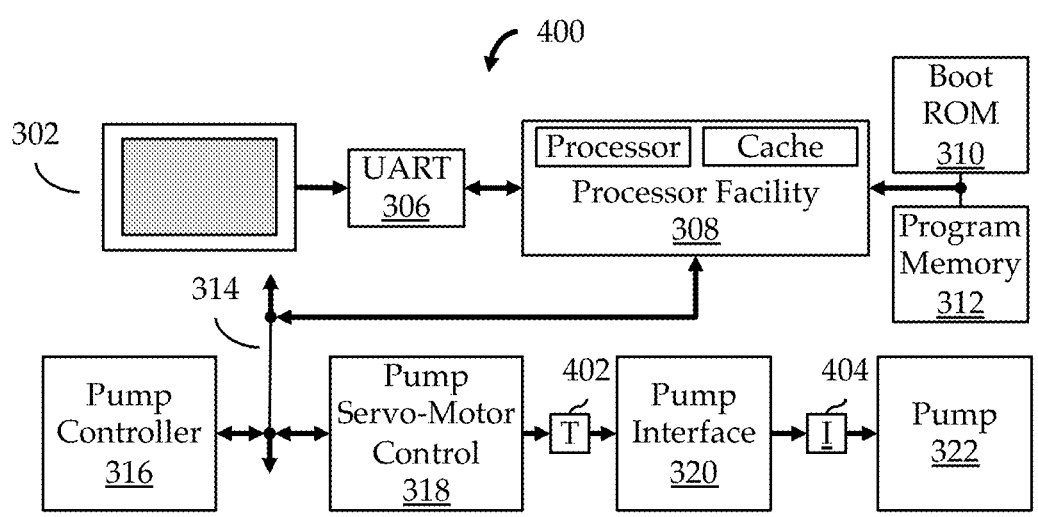
FIG. 4 illustrates, in block diagram form, the exemplary electronic facility of FIG. 3 modified to include trojans and Instruments according some embodiments.
Figure 5A:
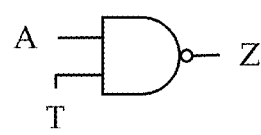
FIG. 5A illustrates, in logic form, an exemplary "stuck at 1" trojan according to some embodiments.
Figure 5B:
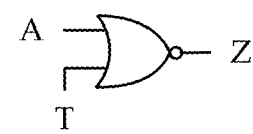
FIG. 5B illustrates, in logic form, an exemplary "stuck at 0" trojan according to some embodiments.

Referring back to FIG. 2, the contributory operation map of Step 212 is now analyzed and evaluated against a vulnerability heuristics database at Step 214. This database comprised of rules and assertions derived from previous experiences with similar data sets, i.e., styles of logic within an electronic system, effective trojan attacks for modifying the behavior of the electronic system, impacting the reliability of the electronic system, or leaking data from the electronic system (See, application Ser. No. 16/145,89, and application Ser. No. 16/450,336). This further analysis using heuristic evaluation focuses in on the best or more optimum place to instantiate a fundamental trojan. Step 216 of method 200 involve selecting and inserting one of the known trojans into a copy of the pristine golden model, thus creating an infected golden model illustrated 400 in FIG. 4. Referring to FIG. 4, and by way of example, a black hat may place trojan 402 across the serial signal between pump servo-motor control 318 and pump interface 320. Trojan 402 may be a stuck-at-1 trojan as illustrated in FIG. 5A or a stuck-at-0 trojan, as illustrated in FIG. 5B. Either way, the ability to control the pump 322 is disabled, effectively breaking the electronic facility 400.

Step 216 of method 200 involves the evaluation of the infected golden model 400 for the purposes of determining the location and instantiation of instruments that will detect the presence of a trojan attack, or multiple trojan attacks. This step may involve simulating, or emulating, the pristine golden model or netlist and the now modified, infected golden model or netlist in parallel with the trojan untriggered. Next, the two models or netlists are again simulated in parallel with the trojan active. Comparing the two simulation results provides insight into selecting a more optimal placement of the instrument within the design. Referring to FIG. 4, this evaluation and analysis of Step 218 may lead the designers to instantiate an instrument 404 across the serial signal between pump interface 320 and pump 322. Once fundamental trojans are placed, the trojan detection instruments and machine learning instruments that can detect anomalous operative (functional activity) and parametric (voltage, power, current leakage, and temperature change) behavior can be placed downstream from the anticipated trojan attack. Emulated trojans can be used to measure the effectiveness and efficiency of instrument placement. Note that the difference between a naturally occurring defect/fault/bug and a trojan is that the trojan usually also has an accompanying trigger—one method to differentiate a latent defect, for example, from an attack is to observe the trigger.

Apparatus, methods and systems according to embodiments of the disclosure are described. Although specific embodiments are illustrated and described herein, it will be appreciated by those of ordinary skill in the art that any arrangement which is calculated to achieve the same purposes can be substituted for the specific embodiments shown. This application is intended to cover any adaptations or variations of the embodiments and disclosure. For example, although described in terminology and terms common to the field of art, exemplary embodiments, systems, methods and apparatus described herein, one of ordinary skill in the art will appreciate that implementations can be made for other fields of art, systems, apparatus or methods that provide the required functions. The invention should therefore not be limited by the above described embodiment, method, and examples, but by all embodiments and methods within the scope and spirit of the invention.

In particular, one of ordinary skill in the art will readily appreciate that the names of the methods and apparatus are not intended to limit embodiments or the disclosure. Furthermore, additional methods, steps, and apparatus can be added to the components, functions can be rearranged among the components, and new components to correspond to future enhancements and physical devices used in embodiments can be introduced without departing from the scope of embodiments and the disclosure. One of skill in the art will readily recognize that embodiments are applicable to future systems, future apparatus, future methods, and different materials.

All methods described herein can be performed in a suitable order unless otherwise indicated herein or otherwise clearly contradicted by context. The use of any and all examples, or exemplary language (e.g., "such as"), is intended merely to better illustrate the disclosure and does not pose a limitation on the scope of the disclosure unless otherwise claimed. No language in the specification should be construed as indicating any non-claimed element as essential to the practice of the disclosure as used herein.

Terminology used in the present disclosure is intended to include all environments and alternate technologies that provide the same functionality described herein.

What is claimed is:

1. A method for selection of a location for placement of a selected one of a trojan, and an instrument within an electronic facility using contributory operation analysis, said method comprising the steps of:
   developing a target operation vector;
   developing a hierarchical module map of a pristine golden Verilog model of said electronic facility, said module map comprising an instance of an operative module;
   inserting an operative monitor into said instance of said operative module, said operative monitor being adapted to record operative activity of said instance of said operative module;
   applying said target operation vectors to said first pristine golden Verilog model, said operative monitor recording said operative activity of said instance of said operative module;
   developing from said operative activity a contributory operation map of said pristine golden Verilog model, said contributory operation map comprising operative activity of said operative module;
   developing an infected golden Verilog model by inserting said trojan into a copy of said pristine golden Verilog model, as a function of said contributory operation map, a vulnerability heuristics database, and a trojan database;

applying said target operation vectors to said infected golden Verilog model, said operative monitor in said infected golden Verilog model recording said operative activity of said instance of said operative module in said infected golden Verilog model;

comparing said operative activity of said pristine golden Verilog model with said operative activity of said infected golden Verilog model; and inserting said instrument into said pristine and infected golden Verilog models, as a function of said comparing of said operative activity of said pristine golden Verilog model with said operative activity of said infected golden Verilog model.

2. The method of claim 1 where said pristine golden Verilog and infected golden Verilog model(s) are hierarchical Verilog model(s).

3. A method for selection of a location for placement of a selected one of a trojan, and an instrument within an electronic facility using contributory operation analysis, said method comprising the steps of:

developing a target operation vector;

developing a hierarchical module map of a pristine golden VHDL model of said electronic facility, said module map comprising an instance of an operative module:

inserting an operative monitor into said instance of said operative module, said operative monitor being adapted to record operative activity of said instance of said operative module;

applying said target operation vectors to said pristine golden VHDL model, said operative monitor recording said operative activity of said instance of said operative module;

developing from said operative activity a contributory operation map of said pristine golden VHDL model, said contributory operation map comprising operative activity of said operative module;

copying said first golden model to a second golden model;

developing an infected golden VHDL model by inserting said trojan into a copy of said pristine golden VHDL model, as a function of said contributory operation map, a vulnerability heuristics database, and a trojan database;

applying said target operation vectors to said infected golden VHDL model, said operative monitor in said infected golden VHDL model recording said operative activity of said instance of said operative module in said infected golden VHDL model;

comparing said operative activity of said pristine golden VHDL model with said operative activity of said infected golden VHDL model; and inserting said instrument into said pristine and infected golden VHDL models, as a function of said comparing of said operative activity of said pristine golden VHDL model with said operative activity of said infected golden VHDL model.

4. The method of claim 3 where said pristine golden Verilog and infected golden Verilog model(s) are hierarchical VHDL model(s).

5. A non-transitory computer readable medium including executable instructions which, when executed in an electronic system, cases the system to perform the steps of a method according to claim 1.

* * * * *